United States Patent Office 2,721,443
Patented Oct. 25, 1955

2,721,443

ELASTIC SHAFT BEARING FOR PRECISION GEARS

Helmut Junghans, Kurt von Zeppelin, Viktor Storz, and Albert Letsche, Schramberg, Germany, assignors to Gebruder Junghans A. G., Schramberg, Germany, a company of Germany Application September 5, 1951, Serial No. 245,126

Claims priority, application Germany September 8, 1950

3 Claims. (Cl. 58—140)

The invention relates to elastic shaft bearings for precision gearing, more especially for clocks. Numerous constructions are known in which the bearing can yield elastically in the axial and radial directions. This method of construction necessitates special means for the centering of the bearing and thus the use of return springs and/or devices for producing radial restoring forces, the size of which is dependent on the surface nature and the condition of the parts in question. The bearing constructions concerned consequently place high requirements on preparation and still leave something to be desired as regards assembly and cleaning.

The object of the present invention is to provide a shock-proof shaft bearing with which it is possible satisfactorily to secure the shaft in such manner as always to maintain accurately the meshing distances of the co-acting parts of the gearing, for example, the anchor and the balance of a clock, which at the same time ensures the maintenance of the oil bubble with elastc yielding, and which finally provides for simple dismantling and cleaning which is required of a modern bearing construction of this nature.

The invention consists in that a shaft includes an elastic pin and the stationary bearing plate includes stops or abutments which are disposed in the region of rigid shaft parts and permit an elastic flexing of the pin, and that the apertured bearing part is mounted together with its cover to be elastically displaceable in the axial direction.

The allocation of the function of elastic yieldability with respect to radial shocks to the shaft pin, and as a consequence thereof, the radial immovability of the bearing provides the satisfactory fixing of the shaft which is sought in accordance with the invention; moreover, it renders it possible for the constructional space which is available to be fully utilised for the respective bearing parts, in contrast to the bearing constructions in which the bearing bush is movable radially and with which the apertured stones usually employed are given an undesirable small diameter. The bearing construction according to the invention is therefore simple in assembly in that account has to be taken of mobility in an axial direction only. The problem of arranging the apertured bearing stone and the end stone in such manner that they can be moved elastically with one another in the axial direction, that is to say, maintaining their spacing resulting from the presence of the oil, can therefore be solved by simple means. In the preferred constructional form of the invention, the apertured bearing part fitted in a bush is mounted, together with its end part loosely fitting on the bush, so as to be axially movable in the bearing member against the action of an end spring. In this arrangement, the end part preferably has the diameter of the bush for the apertured bearing part, so that both parts, namely, the bush and the end stone, are guided in a cylindrical recess of the bearing member. In order to facilitate the removal of the bearing bush with the end stone from the bearing member, it is possible, according to a further feature of the invention, for recesses for the introduction of a tool (tweezers) to be arranged between the bush and the bearing member, preferably in the guide surface thereof.

One constructional example of the invention is shown in the drawing and is hereinafter described.

Figure 1:
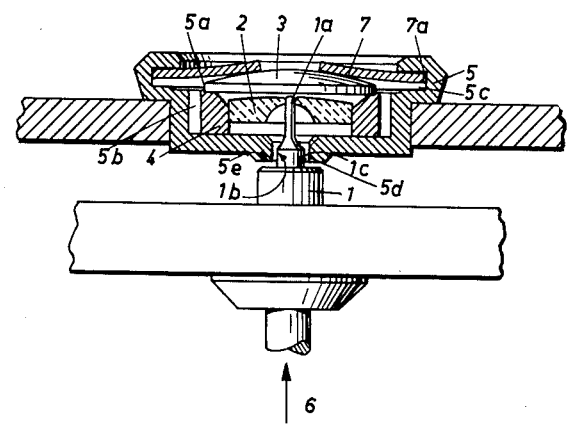
Figure 1 is a vertical section through a balance shaft bearing of a clock, on an enlarged scale.
Figure 2:
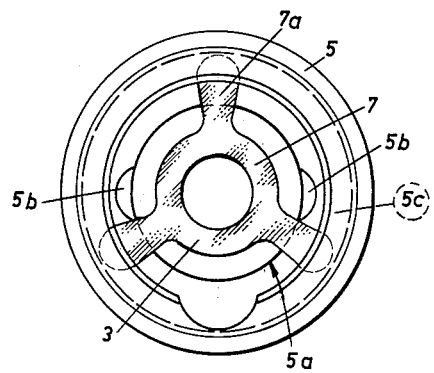
Figure 2 is a corresponding plan view.

The balance shaft is indicated at 1 and the thin elastic shaft pin at 1a. The shaft pin 1a is mounted in the apertured stone 2; 3 indicates the associated end stone. The apertured stone 2 is held in a bush 4 which is fitted to move in the cylindrical turning 5a of the bearing member 5. The end stone 3 rests loosely on the edge of the bush 4; said end stone has approximately the same diameter as the bush 4 and is also guided in the turning 5a, so that the apertured stone 2, the end stone 3 and the bush 4 maintain their relative positions when, due to a shock, they yield axially in the direction of the arrow 6 under the action of the forces of inertia. The star spring 7, which can be turned in with its arms 7a in known manner in an annular groove 5c in the bearing member 5, takes up the movement of the bearing parts 2, 3, 4 and returns them elastically into their initial positions again when the shock has ended.

For cleaning the bearing, the star spring 7 is extracted, then the end stone 3 and finally the bearing bush 4 with the apertured stone 2; in order to facilitate this, recesses 5b are formed in the cylindrical guide surface 5a on the bearing member 5, and the points of a pair of tweezers can be introduced into said recesses.

For limiting the radial and the axial creeping of the shaft 1, radial and axial stops 5d and 5e (Figure 1) are provided on the bearing member 5, said stops facing corresponding stop surfaces 1b and 1c on the shaft.

We claim:

1. A shockproof shaft bearing for precision instruments comprising, in combination, a shaft having a central body portion, a thin elastic portion defining a pivot pin extending axially therefrom and an intermediate cylindrical part between said body portion and pin defining a straight shoulder at the transition between the body portion and said intermediate cylindrical part, a cup-shaped ring member having an internal groove adjacent to the rim thereof, a cylindrical bushing mounted for axial movement in a cylindrical bore of said ring member and having a snug fit therein, an apertured jewel fitted in said axially movable bushing and through which said pin extends, a cap member having a diameter substantially the same as the outer diameter of the movable bushing and positioned on the end of said bushing remote from said shaft, a spring member mounted in said groove and urging the cap member resiliently against the bushing, said ring member having a cylindrical perforation in the bottom thereof and means on the outside of said ring member defining a plane shoulder surrounding said perforation, the diameter of said perforation being such as to form a circular abutment cooperating with the intermediate cylindrical part of the bearing shaft against radial shock, and the shoulder of the bottom of the cup-shaped ring member defining an abutment cooperating with the shoulder of the bearing shaft against axial shock.

2. A bearing as in claim 1 wherein the bushing is of lesser axial length than the cylindrical bore in said ring member, thereby to provide a cylindrical guide surface for the cap member.

3. A bearing as in claim 1 wherein the clearance of the apertured jewel around the pivot pin is less than the clearance of the ring member perforation around the intermediate cylindrical part of the shaft.

References Cited in the file of this patent

UNITED STATES PATENTS

| | | |
|---|---|---|
| 2,272,336 | Colomb | Feb. 10, 1942 |
| 2,489,552 | Widmer-Steiner | Nov. 29, 1949 |

FOREIGN PATENTS

| | | |
|---|---|---|
| 129,346 | Switzerland | Dec. 1, 1928 |
| 198,992 | Switzerland | Oct. 1, 1938 |